US012233654B2

(12) United States Patent
Seras Franzoso et al.

(10) Patent No.: US 12,233,654 B2
(45) Date of Patent: Feb. 25, 2025

(54) RECIRCULATION OF FLUID WITHIN A FLUIDIC EJECTION DEVICE

(71) Applicant: Hewlett-Packard Development Company, L.P., Spring, TX (US)

(72) Inventors: Mauricio Seras Franzoso, Sant Cugat del Valles (ES); Dorkaitz Alain Vazquez Fernandez, Sant Cugat del Valles (ES); David Butinya Teixido, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 157 days.

(21) Appl. No.: 18/031,134

(22) PCT Filed: Oct. 15, 2020

(86) PCT No.: PCT/US2020/055731
§ 371 (c)(1),
(2) Date: Apr. 10, 2023

(87) PCT Pub. No.: WO2022/081158
PCT Pub. Date: Apr. 21, 2022

(65) Prior Publication Data

US 2023/0373222 A1 Nov. 23, 2023

(51) Int. Cl.
*B41J 2/18* (2006.01)
*B41J 2/17* (2006.01)
*B41J 2/175* (2006.01)

(52) U.S. Cl.
CPC ............... *B41J 2/18* (2013.01); *B41J 2/1707* (2013.01); *B41J 2/17556* (2013.01)

(58) Field of Classification Search
CPC . B41J 2/175; B41J 2/17566; B41J 2/18; B41J 2/1707; B41J 2/17556
See application file for complete search history.

(56) References Cited

U.S. PATENT DOCUMENTS

| | | | |
|---|---|---|---|
| 8,752,946 | B2 | 6/2014 | Wells, Jr. et al. |
| 8,814,319 | B2 | 8/2014 | Lebron et al. |
| 9,096,067 | B2 | 8/2015 | Bryant et al. |
| 9,272,523 | B2 | 3/2016 | Sanaei et al. |
| 10,052,881 | B2 | 8/2018 | Wan et al. |

(Continued)

FOREIGN PATENT DOCUMENTS

| | | | |
|---|---|---|---|
| JP | 2015-085660 | A | 5/2015 |
| JP | 2016-068328 | A | 5/2016 |
| JP | 2019-001027 | A | 1/2019 |

*Primary Examiner* — An H Do
(74) *Attorney, Agent, or Firm* — Foley & Lardner LLP

(57) ABSTRACT

Examples in accordance with the present disclosure are directed to a method including generating a negative fluid pressure between a fluid supply and a first port of a fluidic ejection device, and generating a positive fluid pressure between the fluid supply and a second port of the fluidic ejection device. The method further includes selectively activating a first priming pump connected to the first port in response to an indication that the first port is transitioning from an open state to a closed state, wherein the selective activation of the first priming pump causes the first port to remain in the open state and causes fluid within the fluidic ejection device to exit through the first port and to recirculate along a fluid flow path.

15 Claims, 9 Drawing Sheets

(56) References Cited

U.S. PATENT DOCUMENTS

| | | | | |
|---|---|---|---|---|
| 11,772,385 | B2 * | 10/2023 | Butinya Teixido | .... B41J 2/1707 347/89 |
| 2010/0171802 | A1 | 7/2010 | Lee et al. | |

* cited by examiner

RECIRCULATION OF FLUID WITHIN A FLUIDIC EJECTION DEVICE

CROSS-REFERENCE TO RELATED APPLICATIONS

This application is a National Stage Patent Application of PCT/US2020/055731, filed Oct. 15, 2020, which is hereby incorporated by reference in its entirety.

BACKGROUND

Fluidic ejection devices and apparatuses may be used in a number of contexts. As an example, fluidic ejection devices may be used by printing apparatuses to dispense ink or another jettable fluid onto a substrate, such as print medium. By way of example, a fluidic ejection device may include electronic and fluidic delivery components to enable dispensing the jettable fluid to form markings on the print medium by a printing apparatus. In the context of printing apparatuses, such fluidic ejection devices may alternatively be referred to as "printheads." While fluidic ejection devices may be relevant to printing, fluidic ejection devices may be used in other contexts, such as in the field of biomedical devices for testing fluids and fluid components.

DETAILED DESCRIPTION

Figure 1:
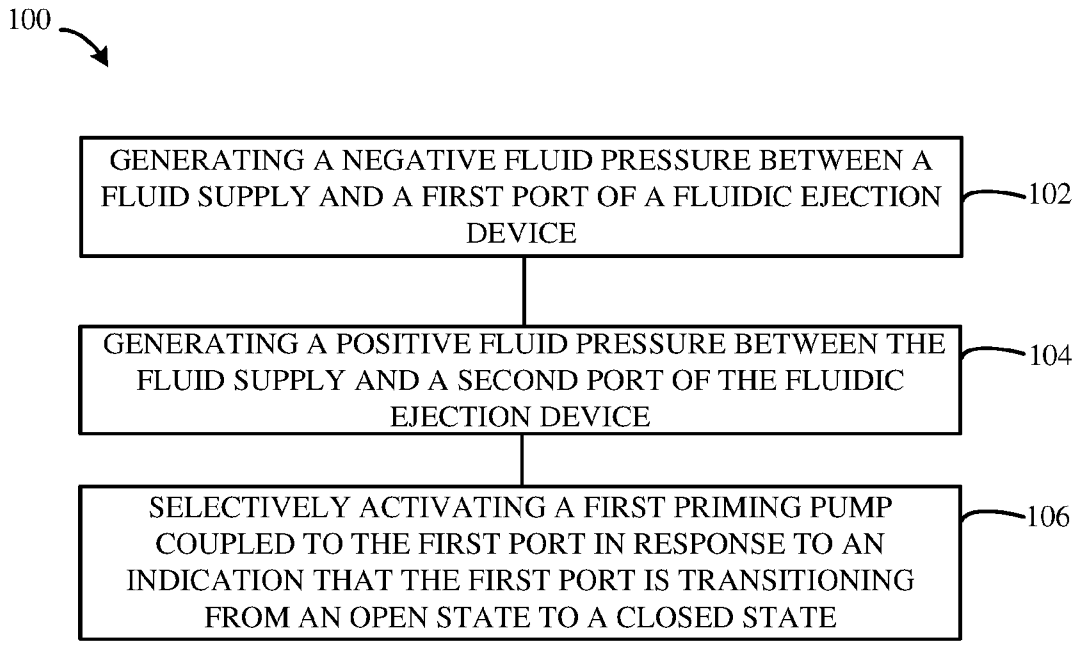
FIG. 1 illustrates an example method of recirculating fluid within a fluidic ejection device, in accordance with examples of the present disclosure.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Fluidic ejection devices may be used to eject fluid onto a substrate by an apparatus, such as for printing ink or dispensing reagents. Different dispensing fluids may include pigments or other particulars which may settle and/or otherwise agglomerate in a fluid flow path of the fluidic ejection device when the fluid is at rest. Such fluids may benefit from fluid recirculation when the fluidic ejection device is not ejecting fluidic onto the substrate. For example, over time, the settling or agglomeration may lead to partial or full blocking of the fluid flow path. As a specific example, in a printing device, the settled pigment or particles may make the printing fluid more viscous or form a clot. This may hinder or prevent fluid flow of the printing fluid during a subsequent print job.

Fluid may be recirculated within a fluidic ejection device and/or other components of a fluid dispensing apparatus by using a pulsed signal to periodically activate a priming pump. Using pulses to activate the priming pump for the entire recirculation cycle may cause stress on hardware of the fluidic ejection device and/or the apparatus coupled to the fluidic ejection device. Such stress may reduce the life time of the priming pumps, the solenoid valves, and/or regulators of the fluidic ejection devices as compared to devices without such stress. There may be a desire, therefore, for an approach of recirculating fluid within a fluidic ejection device without damaging components of and/or which are connected to the fluidic ejection device.

The present disclosure includes apparatuses, devices, and/or methods of operating an apparatus to provide recirculation of fluid contained in a fluid ejection device. Examples described herein use a variation in pressure detected by a pressure sensor within the fluid flow path to cause a priming operation. The priming operation causes fluid, such as ink, contained in the fluid ejection device to be recirculated within the fluid ejection device and/or other components of the apparatus. The priming operation may prevent a port of the fluidic ejection device from closing and keeps recirculation flow running, while minimizing the number of primes for operating the recirculation flow. Minimizing the number of primes may extend the life and reliability of various hardware components of the apparatus, while allowing for use of recirculation flow for a variety of purposes, including but not limited to, mixing fluids (which may be used to suspend particles in the fluid and/or prevent the particles from settling and/or agglomerating), air management in fluid delivery, and temperature regulation of fluid and/or the fluidic ejection device. For example, fluidic ejection devices may increase the temperature of the fluid during dispensing, and if the rise in temperature is too high, the quality of dispensing fluids, such as for printing, may deteriorate over time. The fluidic recirculation may be used to maintain or manage the temperature of the fluids.

As noted above and as used herein, a fluidic ejection device includes electronic and fluidic delivery components to enable ejecting of fluids. The fluidic ejection device may form part of an apparatus, such as a fluid dispensing apparatus. In some examples, the fluidic ejection device may be implemented as a printhead and which may form part of or is connectable to a printer to eject printing fluid. The fluid dispensing apparatus may eject fluid from the fluidic ejection device onto a substrate, such as onto paper, a layer of powdered-based build material, or a reactive device or another substrate, which may be used for a biologic or chemical assay.

Turning now to the figures, FIG. 1 illustrates an example method of recirculating fluid within a fluidic ejection device, in accordance with examples of the present disclosure. The method 100 may provide recirculation of fluid within the fluidic ejection device and/or other components of an apparatus connected to the fluidic ejection device. The term "recirculation" is generally used herein to indicate that fluid is moved from a fluidic ejection device (or other apparatus part downstream of a supply of the fluid) back to a supply of the fluid. The method 100 may be implemented by a controller circuit, such as controller circuit 214 illustrated by FIGS. 2A-2B, in a number of examples.

At 102, the method 100 includes generating a negative fluid pressure between a fluid supply and a first port of a fluidic ejection device, and at 104, generating a positive fluid pressure between the fluid supply and a second port of the fluidic ejection device. The negative fluid pressure may be created by a first fluidic pump of the apparatus, such as a fluid dispensing apparatus connected to the fluidic ejection device. The positive fluid pressure may be created by a second fluidic pump of the apparatus. In some examples, generating the negative fluid pressure may include instructing the first fluidic pump, by the controller circuit of the apparatus, to create the negative fluid pressure. In some examples, generating the positive fluid pressure may include instructing the second fluidic pump, by the controller circuit, to create the positive fluid pressure. However, examples are not so limited.

At 106, the method 100 includes selectively activating a first priming pump connected to the first port in response to an indication that the first port is transitioning from an open state to a closed state. The selective activation of the first priming pump may include controlling recirculation of the fluid between the fluid supply and the fluidic ejection device using closed-loop priming, and which may be controlled by the controller circuit. The selective activation of the first priming pump may cause the first port to remain in the open state and cause fluid within the fluidic ejection device to exit through the first port and to recirculate along a fluid flow path, which is sometimes herein referred to as "recirculation path". As further described below, the indication may include a sensor signal from a sensor within the first flow path. In some examples, as illustrated by at least FIG. 3, in response to the selective activation of the first priming pump, the method 100 may include activating a regulator to transition the first port to the open state and to maintain the first port in the open state.

In various examples, the first priming pump may be activated using multiple priming operations. For example, the selective activation of the first priming pump may include the controller circuit providing a first pulsed signal to the first priming pump and until a first sensor signal is received, and providing a second signal to the first priming pump in response to the indication. The first sensor signal may indicate that fluid is flowing along the fluid flow path and/or that the first port is in the open state. For example, the first port may transition from the closed state to the open state in response to the first pulsed signal, as further described below. The indication may include a second sensor signal that indicates the first port is transitioning to the closed state (from the open state). The first port may remain in the open state in response to the second signal. For example, as further described below, the first sensor signal may cause a first priming operation and which causes the first port to remain in an open state. The second signal may cause a second priming operation prior to (and that prevents) closure of the first port during the recirculation of fluid.

The first pulsed signal may include a plurality of pulses. The second signal may include or be referred to as a single pulsed signal or single signal. The first priming pump may be activated (for example, the first priming pump provides a pumping action) at each pulse of the first pulsed signal and in response to the second signal, such that the first port is selectively opened at each pulse of the first pulsed signal. The first priming pump, in response to the first pulsed signal and the second signal, may cause the first port to remain open during the recirculation cycle, such that the fluid exits the fluidic ejection device through the first port.

In some examples, the first pulsed signal has a duty cycle of 50 percent (%). In some examples, the duty cycle of the first pulsed signal may vary, for example, based on hardware specifications of the apparatus. For example, the first pulsed signal may have a maximum duty cycle of 50%, such that the duty cycle may be in the range of 30% to 50%. In other examples, the pulsed signal may have a maximum duty cycle of 70%. Other duty cycle options are possible in different implementations, such as in the range of 40% to 50%, 40% to 60%, 30% to 70%, etc.

Figure 2A:
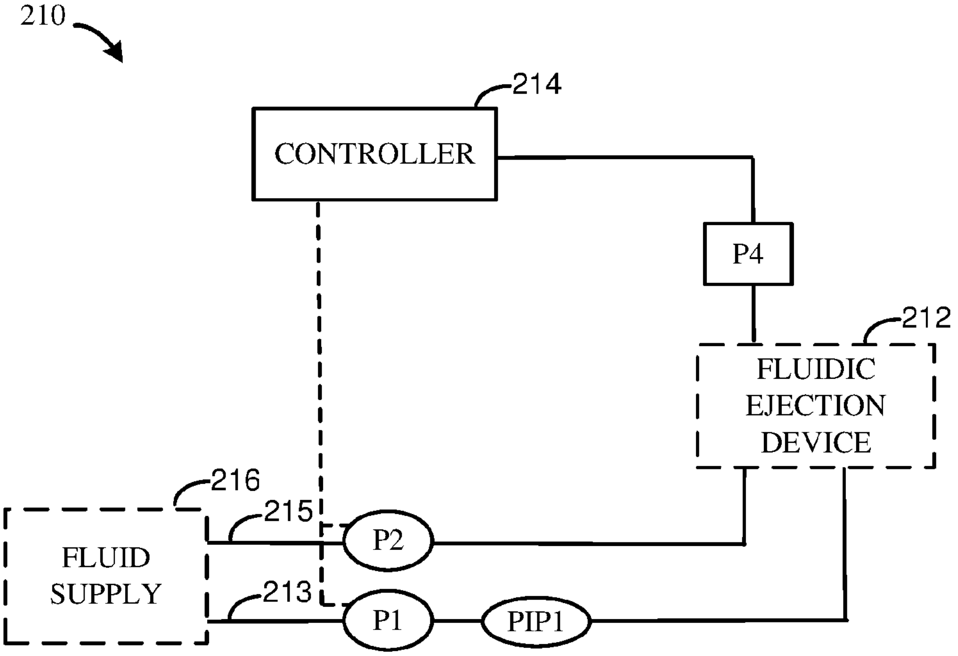
FIGS. 2A-2B illustrate example apparatuses that recirculate fluid within a fluidic ejection device, in accordance with examples of the present disclosure.
Figure 2B:
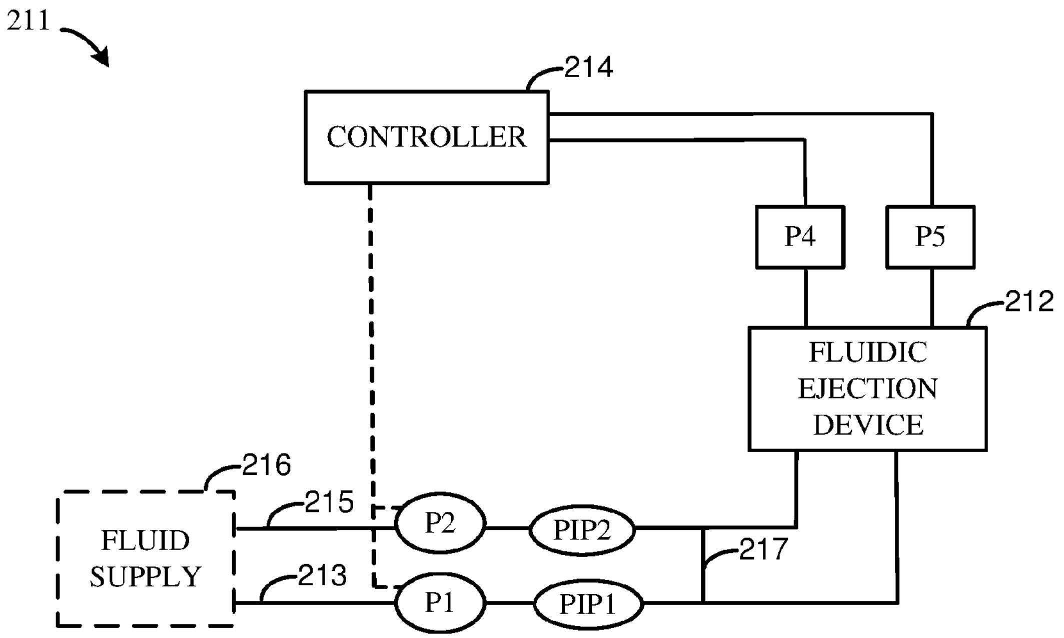

In some examples, the method 100 may further include capturing the first sensor signal via a second pressure sensor located proximal to a second fluidic pump that creates the positive fluid pressure, such as the second pressure sensor PIP2 and second fluidic pump P2 illustrated by FIG. 2B. The first sensor signal may indicate the fluid is flowing through the fluid flow path. In some examples, the method 100 may include capturing the second sensor signal via a first pressure sensor located proximal to a first fluidic pump that creates the negative fluid pressure, such as the first pressure sensor PIP1 and first fluidic pump P1 illustrated by FIGS. 2A-2B. The second sensor signal may indicate a change in pressure at the first pressure sensor, such as a decrease in pressure as further described herein.

Although the above method describes an example of selectively activating a first priming pump to cause a first port to remain in an open state, examples are not so limited. In some examples, a second priming pump may be activated. For example, the method 100 may further include removing the negative fluid pressure and positive fluid pressure, generating a second negative fluid pressure between the fluid supply and the second port, and generating a second positive fluid pressure between the fluid supply and the first port. The method 100 may further include selectively activating a second priming pump connected to the second port in response to an indication that the second port is transitioning from the open state to the closed state. The selective activation of the second priming pump may cause the second port to remain in the open state and causes fluid within the fluidic ejection device to exit through the second port.

The activation of the first priming pump maybe used to provide a first recirculation mode and the activation of the second priming pump may be used to provide a second recirculation mode, such as a reverse recirculation mode and a forward recirculation mode as further described herein. A mode of operation, as used herein includes and/or refers to the operation and/or states of components of the apparatus used for providing a functionality, such as dispensing fluid or recirculating fluid. When the apparatus is operating in a fluid dispensing mode, as further shown by FIG. 10, fluid may dispensed from the fluid supply to the medium using the fluidic ejection device. When the apparatus is operating in a fluid recirculation mode, as further shown by FIGS. 5-6-9, fluid may be recirculated within the fluidic ejection device and the fluid supply.

In various examples, the method 100 may be implemented by apparatuses and/or devices disclosed herein, such as those further illustrated by FIGS. 2A-6 and 8-10. The apparatus may include a fluid dispensing apparatus that includes or is connectable to a fluidic ejection device.

FIGS. 2A-2B illustrate example apparatuses that recirculate fluid within a fluidic ejection device, in accordance with examples of the present disclosure. As shown by FIGS. 2A-2B, the apparatus 210, 211 may include and/or is implemented as a fluid dispensing device or apparatus that includes first and second fluidic pumps P1 and P2 (selectively activatable fluid pressure sources), a first priming pump P4, a first pressure sensor PIP1, a first flow path 213, a second flow path 215, and a controller circuit 214. In some examples, as shown by FIG. 2B, the apparatus 211 may further include a second priming pump P5 and a second pressure sensor PIP2, a fluidic ejection device 212, and/or a fluid supply 216, as further described herein. While each apparatus 210, 211 illustrated by FIGS. 2A-2B may be different, in some examples, the apparatuses 210, 211 include similar functions and/or structures. Similar components are therefore not further described in detail.

In some examples, the apparatuses 210, 211 may be a printing device or apparatus and which may include or is connectable to a fluidic ejection device 212. The fluidic ejection device 212 is connectable to the fluid supply 216 by the first flow path 213 and second flow path 215. The fluidic ejection device 212 may include a first port (such as a closable first opening) connectable to the first flow path 213 and a second port (such as a closable second opening) connectable to the second flow path 215. The first and second ports may be selectively connectable to each of the first flow path 213 and the second flow path 215, as further described herein. As described below, the first fluidic pump P1 and second fluidic pump P2 may create positive and negative pressures between the fluid supply 216 and the ports of the fluidic ejection device 212. Although a single fluidic ejection device 212 is shown in FIGS. 2A-2B, example apparatuses may include multiple fluid ejection devices operating in parallel.

The first priming pump P4 may be connected to the first port of the fluidic ejection device 212. The first priming pump P4 and/or the second priming pump P5 may be pressure control mechanisms used to increase a fluid pressure in the fluidic ejection device 212. The first port of fluidic ejection device 212 may be in an open state in response to an operation of the first priming pump P4 and the second port of fluidic ejection device 212 may be in an open state in response to an operation of a second priming pump P5. The controller circuit 214 may be connected to the first priming pump P4 and may provide a signal to the first priming pump P4 to activate the first priming pump, as further described herein.

In various examples, the fluid supply 216 may be implemented as or may take any form suitable to store fluid, such as printing fluid. For example, the fluid supply 216 may be a tank or other receptacle. The fluid supply 216 may be a closed reservoir or may be open to the atmosphere.

The first pressure sensor PIP1 may be located within a fluid flow path of the apparatus 210. The fluid flow path may include the first flow path 213 which is connectable to the first port of the fluidic ejection device 212 and a second flow path 215 which is connectable to the second port of the fluidic ejection device 212. In some examples, the first port may further be selectively connectable to the first flow path 213 for a first recirculation mode and to the second flow path 215 for a second recirculation mode. Similarly, the second port may be selectively connectable to the second flow path 215 for the first recirculation mode and to the first flow path 213 for the second recirculation mode. As shown by FIGS. 2A-2B, the first pressure sensor PIP1 may be located within the first flow path 213 and proximal to the first fluidic pump P1. In some examples, as shown by FIG. 2B, the apparatus 211 may further include a second pressure sensor PIP2 that is located within the second flow path 215 and is proximal to the second fluidic pump P2.

Each of the first and second flow paths 213, 215 may take any suitable form to move fluid from one location to another. For example, the first and second flow paths 213, 215 may include any combination of tubes, conduits, valves, connectors, pumps or the like. In some examples, as shown by FIG. 2B, the first and second flow paths 213, 215 are connected by a bypass path 217. The bypass path 217 may connect a point on the first flow path 213 between the fluid supply 216 and the first port of the fluidic ejection device 212 to a point on the second flow path 215 between the fluid supply 216 and the second port of the fluidic ejection device 212. The bypass path 217 may include a valve (not illustrated by FIGS. 2A-2B) which may be communicatively connected to and controllable by the controller circuit 214. The valve may normally be closed (preventing fluid flow), but may be opened (allowing fluid flow), for example, to enable a positive fluid pressure to be simultaneously applied to both the first ports and the second ports, as is described further below. The first flow path 213 and the second flow path 215 together with the fluid supply 216 may form or otherwise be included in a fluid supply system to supply fluid from the fluid supply 216 to the fluidic ejection device 212.

The fluidic ejection device 212 may include a plurality of nozzles to apply fluid to a substrate, such as paper. The fluidic ejection device 212 may include a regulator mechanism, for regulating the flow of printing fluid into the fluidic ejection device 212. The fluidic ejection device 212, in some examples, is a separate device from the apparatus 210, such as illustrated by FIG. 2A and is connectable to the apparatus 210. In some examples, as shown by FIG. 2B, the fluidic ejection device 212 is connected to the apparatus 211 and may, at least temporarily, form part of the apparatus 211. The terms "connected" and "connectable" are sometimes herein used to denote when the fluidic ejection device 212 forms part of the apparatus 211 and is "connected", and when the fluidic ejection device 212 is separate from and/or may not form part of the apparatus 210 and may be "connectable" thereto. The fluidic ejection device 212 is described in more detail below with reference to FIG. 3.

The controller circuit 214 may control a priming operating using the first priming pump P4 and/or the second priming pump P5. For example, the first priming pump P4 and/or the second priming pump P5 may be communicatively linked to the controller circuit 214 by a communication link(s), which may be wired or wireless communication links. The priming pumps P4, P5 may be selectively activated by the controller circuit 214. The priming pumps P4, P5 are described in more detail below with reference to FIGS. 4 to 10.

The first fluidic pump P1 may create a negative fluid pressure between the fluid supply 216 and the first port of the fluidic ejection device 212, such as to pump fluid from the fluidic ejection device 212 towards the fluid supply 216 (for example, using suction pressure). The first fluidic pump P1 may be a selectively activatable fluid pressure source which may be activatable by the controller circuit 214. The first fluidic pump P1 may include an air pump. In some examples, the first fluidic pump P1 may not be selectively activatable. For example, the first fluidic pump P1 may be a gravitational fluid pressure source, wherein the negative fluid pressure is created by a height difference between the fluid supply 216 and the first port.

When the fluidic ejection device 212 forms part of the apparatus 210, 211, the first fluidic pump P1 is connected between the fluid supply 216 and the first port, and may be used to selectively pump fluid towards the fluid supply 216 through the first flow path 213. In some examples, the first fluidic pump P1 may also operate in reverse, to pump fluid from the fluid supply 216 towards the first port. Any suitable type of fluidic pump may be used as the first fluidic pump P1. For example, the first fluidic pump P1 may comprise a suction pump. When the suction pump is activated, it operates to create a fluid flow from the fluidic ejection device 212 towards the fluid supply 216.

In some examples, the second fluidic pump P2 may create a positive fluid pressure between the fluid supply 216 and the second port of the fluidic ejection device 212. For example, the second fluidic pump P2 may pump fluid from the fluid supply 216 towards the second port. The second fluidic pump P2 may be a selectively activatable fluid pressure source that is activatable by the controller circuit 214. The second fluidic pump P2 may include an air pump.

The first priming pump P4 may form part of the fluidic ejection device 212 and/or may be separate from and connectable to the fluidic ejection device 212. In some examples, the apparatus 210 and/or the fluidic ejection device 212 may comprise the first priming pump P4 and not a second priming pump P5, as shown by the apparatus 210 of FIG. 2A. In such examples, the first priming pump P4 may be selectively associated with the first port and the second port of the fluidic ejection device 212. The first priming pump P4 may, in some examples, be connected to a first port in a first recirculation mode and a second port in a second recirculation mode, such as a reverse recirculation mode and a forward recirculation mode.

The controller circuit 214 may selectively activate the first priming pump P4, the first fluidic pump P1, and/or the second fluidic pump P2 while the apparatus 210 operating in a fluid recirculation mode. In some examples, the controller circuit 214 may activate the first priming pump P4 in response to a sensor signal from the first pressure sensor PIP1. For example, the controller circuit 214 may provide a signal to the first priming pump P4 to selectively activate the first priming pump P4 in response to a sensor signal from the first pressure sensor PIP1. The sensor signal may indicate that the first port is transitioning from an open state to a closed state. The selective activation of the first priming pump P4 may cause the first port to remain in the open state and causes fluid within the fluidic ejection device 212 to exit through the first port and recirculate along the fluid flow path, such as a recirculation path along at least part of the first and second flow paths 213, 215.

In some examples, as shown by FIG. 2B, the apparatus 211 further includes the second pressure sensor PIP2. The controller circuit 214 may provide a first pulsed signal to the first priming pump P4, which may be provided after the first fluidic pump P1 is activated for a recirculation cycle and until a first sensor signal is received from the second pressure sensor PIP2. A recirculation cycle, as used herein, includes and/or refers to a period of time for recirculating fluid during a recirculation mode of the apparatus. The first sensor signal may indicate that the first port is in the open state and/or the fluid is flowing along the fluid flow path. The first pulsed signal may cause the first port to transition to the open state. The controller circuit 214 may provide the signal to the first priming pump P4 in response to the sensor signal from the first pressure sensor PIP1. The first port may remain in the open state in response to the sensor signal. The signal provided to the first priming pump P4 is sometimes herein interchangeably referred to as the "second signal" and the sensor signal from the first pressure sensor PIP1 is sometimes interchangeably referred to as the "second sensor signal". As noted above, the signal (or second signal) causes the first port to remain in the open state and the first port being in the open state causes fluid within the fluidic ejection device 212 to exit through the first port and recirculate along the first flow path 213. In some examples, the recirculation path may be along the first flow path 213 and the second flow path 215, and/or along at least part of the first flow path 213 and/or the second flow path 215.

In various examples, the controller circuit 214 includes a processor and machine-readable storage medium storing a set of machine-executable instructions that are executable by the processor. The machine-readable storage medium may, for example, include read-only memory (ROM), random-access memory (RAM), electrically erasable programmable read-only memory (EEPROM), Flash memory, a solid state drive, and/or discrete data register sets. The processor may include a central processing unit (CPU) or another suitable processor. In some examples, the controller circuit 214 may include multiple processors and multiple machine-readable storage medium. In such examples, the instructions may be distributed and stored across the multiple machine-readable storage mediums and the instructions may be distributed and executed across multiple processors. The processor of the controller circuit 214 may execute the instructions to activate the first fluidic pump P1, activate the second fluidic pump P2, provide a first pulsed signal, and provide a second pulsed signal (responsive to signals from PIP1 and PIP2), as described above.

Figure 3:
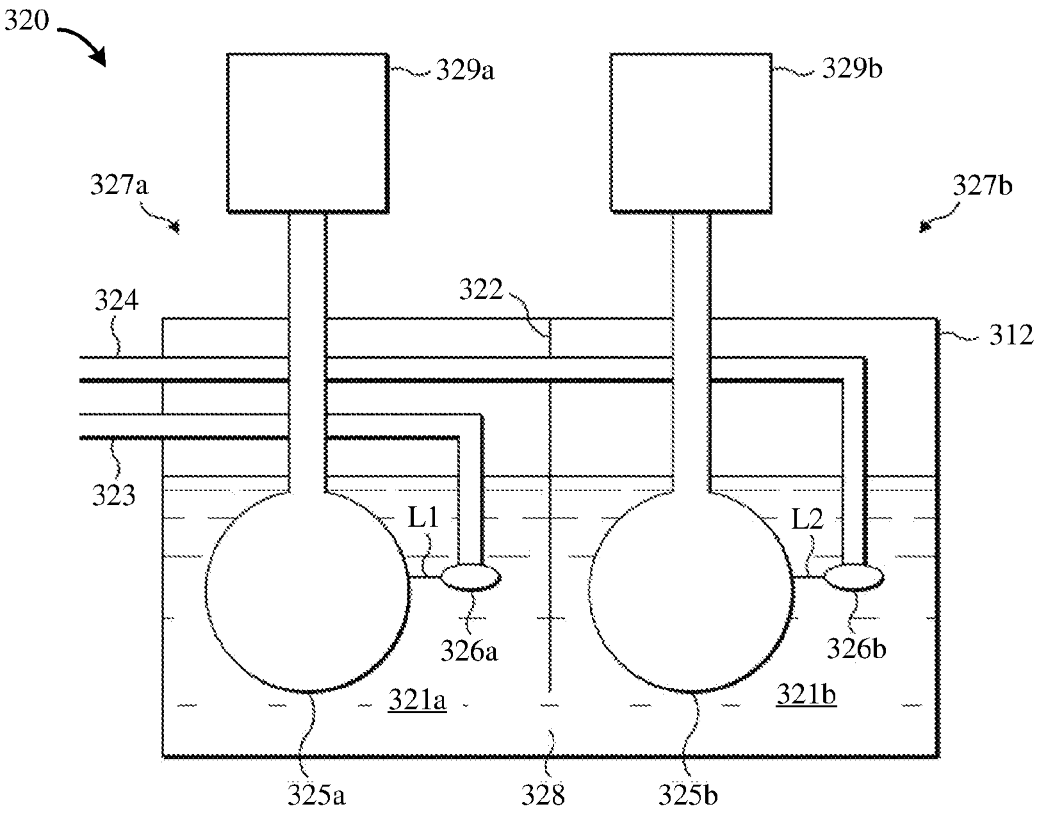
FIG. 3 illustrates an example apparatus including a fluidic ejection device, in accordance with examples of the present disclosure.

FIG. 3 illustrates an example apparatus that includes a fluidic ejection device, in accordance with examples of the present disclosure. The fluidic ejection device 312 may form part of an apparatus 320, such as the apparatus 210, 211 illustrated by FIG. 2A and/or FIG. 2B.

The fluidic ejection device 312 may include a variety of different types of devices. Example fluidic ejection devices may include ink-based ejection devices, digital titration devices, two-dimensional (2D) and/or three-dimensional (3D) printing devices, pharmaceutical dispensation devices, lab-on-chip devices, fluidic diagnostic circuits, and/or other such devices in which amounts of fluids may be dispensed or ejected. As specific examples, an ink-based ejection device may include a thermal inkjet (TIJ) ejection device, a bubblejet ejection device, or a piezo-based ejection device.

In specific examples, the fluidic ejection device 312 may be implemented as a printhead and may form part of a printing apparatus, such as an inkjet printing apparatus. The fluidic ejection device 312 may comprise various features such as filters, nozzles, and the like which are used during a dispensing operation, such as a printing operation, but are not involved in the recirculation of fluid in the fluidic ejection device 312. Such features are therefore not described in detail herein.

The fluidic ejection device 312 may include a first chamber 321*a* and a second chamber 321*b*. The first chamber 321*a* is separated from the second chamber 321*b* by a partition 322. In some examples, the partition 322 may partially separate the first and second chambers 321*a*, 321*b*, such that the first and second chambers 321*a*, 321*b* are in fluid communication via a gap 328. In some examples, the first and second chambers 321*a*, 321*b* are substantially equal in size and configuration, however, examples are not so limited.

A first port 326*a* of the fluidic ejection device 312 may open into the first chamber 321*a*, and a second port 326*b* of the fluidic ejection device 312 may open into the second chamber 321*b*. As shown by FIG. 3, the first port 326*a* may include an open end of a first tube 323 which extends into the first chamber 321*a*. In some examples, the first tube 323 may not extend into the first chamber 321*a*, in which case the first port 326*a* may include an opening in a wall of the first chamber 321*a*. The first tube 323 may form part of the first flow path 213 as illustrated by FIGS. 2A-2B. In the illustrated example, the second port 326*b* similarly includes an open end of a second tube 324 which extends into the second chamber 321*b*. In other examples, the second tube 324 may not extend into the second chamber 321*b*, in which case the second port 326*b* may include an opening in a wall of the second chamber 321*b*. The second tube 324 may form part of the second flow path 215 as illustrated by FIGS. 2A-2B.

In some examples, the first and second ports 326*a*, 326*b*, and associated mechanism for transitioning to a closed state and an open state, may be substantially identical, although examples are not so limited. The following describes, in detail, example mechanisms for transitioning the first port 326*a* between the closed state and open state, and the second port 326*b* is described in less detail. Unless otherwise stated, features of the first port 326*a* and its associated closure mechanisms may be replicated in respect of the second port 326*b*.

In various examples, the fluidic ejection device 312 may include a first regulator 327*a* to place the first port 326*a* in the open state and in the closed state, and a second regulator 327*b* to place the second port 326*b* in the open state and in the closed state. The first regulator 327*a* may include a first regulator bag 325*a* that inflates in response to the activation of the first priming pump 329*a* and the second regulator 327*b* may include a second regulator bag 325*b*. A second priming pump 329*b* may activate to inflate the second regulator bag 325*b*.

In some examples, the first port 326*a* includes a valve to selectively transition between the open state and the closed state. When in a closed state, the first port 326*a* is closed which may provide or block a flow path between the fluidic ejection device 312 and the fluid supply (not illustrated by FIG. 3), such as the fluid supply 216 illustrated by FIGS. 2A-2B. As used herein, an open state of a port refers to and/or includes a port that is open greater than a threshold amount and/or is in a threshold open position. When a port is in an open state, fluid may flow between the respective chamber of the fluidic ejection device 312 and a flow path of the apparatus 320, such as from or to a fluid supply and/or on a recirculation path. A closed state of a port refers to and/or includes a port that is open less than the threshold amount and/or is in a threshold closed position. When a port is in the closed state, fluid may not flow between the respective chamber of the fluidic ejection device 312 and the flow path of the apparatus 320 and/or may flow below a threshold amount.

In some examples, the first port 326*a* may include a needle which is closable by a regulator valve. A regulator valve may be used for selectively allowing fluid into the fluidic ejection device 312 during a dispensing operation of the apparatus 320. A regulator valve may open automatically when a level of fluid in the fluidic ejection device 312 drops below a predefined threshold. In some examples, the regulator valve may be actuated mechanically, such as by exploiting a physical effect of the change in fluid level.

A pressure control mechanism, such as the first regulator 327*a* associated with the fluidic ejection device 312 may be connected to the first port 326*a*. The first regulator 327*a* may increase a fluid pressure in the fluidic ejection device 312. In some examples, the first regulator 327*a* may increase the fluid pressure in the first chamber 321*a*, for example, as part of a priming process for the fluidic ejection device 312.

The first regulator 327*a* may include an expandable component, such as a first regulator bag 325*a*, which is disposed within the first chamber 321*a*. The first regulator 327*a* may be associated with the first priming pump 329*a* to cause expansion of the first regulator bag 325*a*. During fluid dispensing, the interior of the first regulator bag 325*a* is open to atmosphere, such that it expands as the amount of fluid in the first chamber 321*a* reduces. The first regulator bag 325*a* is connected to the first port 326*a* such that expansion of the first regulator bag 325*a* causes the first port 326*a* to be in an open state.

As shown by FIG. 3, in some examples, the first regulator bag 325*a* is in contact with a lever L1, such that the inflation of the first regulator bag 325*a* causes movement of the lever L1. The lever L1 and valve seat may be positioned so that when the first regulator bag 325*a* is not inflated, the valve seat blocks a valve opening of the first port 326*a*. When the first regulator bag 325*a* is inflated, the valve seat may not block the valve opening of the first port 326*a*. When the first regulator bag 325*a* is partially inflated, the lever L1 may be in an intermediate positon in which the valve seat partially blocks the valve opening of the first port 326*a*. In some examples, the valve may be used to control the size of the opening of the first port 326*a*, in which case the connection between the first port 326*a* and the first regulator bag 325*a* may be such that the size of the opening of the first port 326*a* is controlled in dependence on the degree of inflation of the first regulator bag 325*a*.

The first priming pump 329*a* may cause the first regulator bag 325*a* to be inflated regardless of the fluid level in the first chamber 321*a*. The inflation may increase the fluid pressure in the first chamber 321*a* in order to force fluid out through nozzles of the fluidic ejection device 312 and/or to remove air or debris from the nozzles.

Operations of the second regulator 327*b* in relation to second priming pump 329*b*, second port 326*b*, the second regulator bag 325*b*, lever L2, and the second chamber 321*b* may be similar to the operations of the first regulator 327*a* as described above in relation to the first priming pump 329*a*, the first port 326*a*, the first regulator bag 325*a*, the lever L1, and the first chamber 321*a*, which are not repeated.

Figure 4:
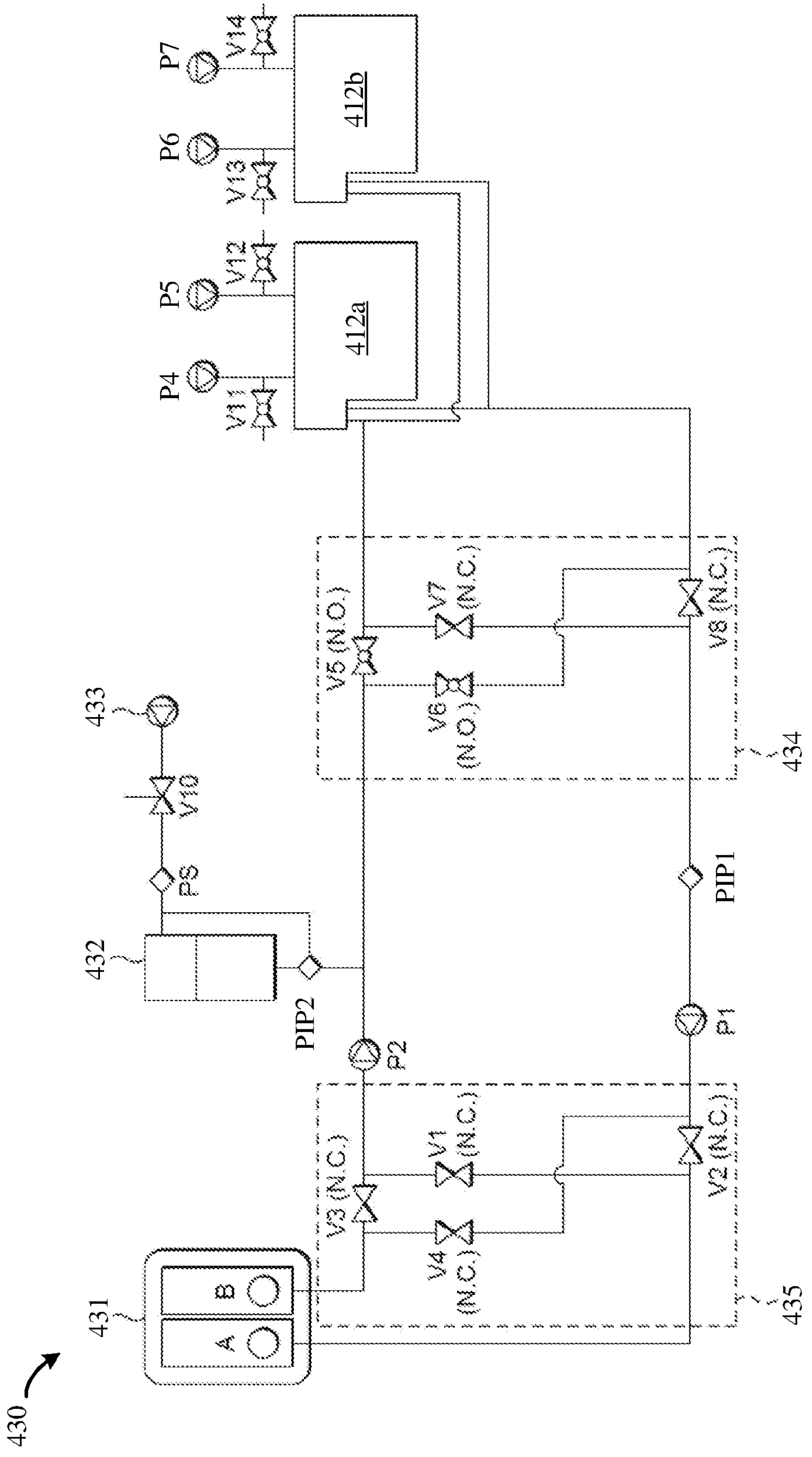
FIG. 4 illustrates another example apparatus for recirculating fluid within a fluidic ejection device, in accordance with examples of the present disclosure.

FIG. 4 illustrates another example apparatus, in accordance with examples of the present disclosure. The apparatus 430 may be implemented as a fluid dispensing apparatus which includes or is otherwise connectable to a fluidic ejection device, such as the fluidic ejection device 312 illustrated by FIG. 3. The apparatus 430 and/or the fluidic ejection device(s) 412*a*, 412*b* may comprise at least some of the components of the apparatuses 210, 211 illustrated by FIGS. 2A-2B and/or the components of the fluidic ejection device 312 illustrated by FIG. 3.

The apparatus 430 may include and/or be connected to a fluidic ejection device 412*a* including a first port connected to a first flow path, a second port connected to a second flow path, and a first regulator connected to the first port to selectively place the first port in an open state and a closed state, as previously described by FIG. 3. The apparatus 430 may further include a first fluidic pump P1, a second fluidic pump P2, a first pressure sensor PIP1, a second pressure senor PIP2, a first primping pump P4, and a controller circuit (not illustrated), such as those previously described by FIGS. 2A-2B.

The apparatus 430 may include additional components. In some examples, the apparatus 430 may include multiple fluidic ejection devices 412*a*, 412*b*. In the example illustrated by FIG. 4, the apparatus 430 includes a first fluidic ejection device 412*a*, a second fluidic ejection device 412*b*, a first fluid supply 431, a second fluid supply 432, a dispensing pump 433, a first valve assembly 434, a second valve assembly 435, and a valve V10.

As described above, the apparatus 430 includes first and second fluidic pumps P1 and P2, which may include and/or are implemented as previously described by fluidic pumps P1, P2 of FIGS. 2A-2B. Similarly, the fluidic ejection devices 412*a*, 412*b* are similar to the fluidic ejection device 312 described by FIG. 3. Although FIG. 4 illustrates two fluidic ejection devices 412*a*, 412*b*, examples are not so limited and example apparatuses in accordance with the present disclosure may include more or less than two ejection devices.

The apparatus 430 may include first and second priming pumps P4, P5. In various examples, the fluidic ejection devices 412*a*, 412*b* include priming pumps P4, P5, P6, P7. For example, the first fluidic ejection device 412*a* includes the first and second priming pumps P4, P5, and the second fluidic ejection device 412*b* includes the third and fourth priming pumps P6, P7. The first priming pump P4 may be connectable to an interior of a regulator bag, such as the first regulator bag 325*a* illustrated by FIG. 3, by a valve V11. During normal fluid dispensing operation, the valve V11 may allow for the interior of the first regulator bag 325*a* to be open to the atmosphere, such that the first priming pump P4 is not connected to the first regulator bag 325*a*. During recirculation, the valve V11 allows for the interior of the first regulator bag 325*a* to be connected to the first priming pump P4, such that the interior is not opened to the atmosphere. Similarly, the second priming pump P5 may be connectable to an interior of a regulator bag, such as the second regulator bag 325*b* illustrated by FIG. 3, by a valve V12. The interior of the second regulator bag 325*b* may be open to the atmosphere or may be connected to the second priming pump P5 depending on the state of the valve V12. Priming pumps P6, P7 are similarly connectable to the interior of regulator bags of the fluidic ejection device 412*b* depending on the state of valves V13 and V14 respectively.

The first valve assembly 434 may include valves V5, V6, V7, and V8, and is used for implementing a fluid dispensing mode, a first recirculation mode, and/or a second recirculation mode of the apparatus 430, as discussed further below. Valve V5 may be normally open to fluid flow (N.O.), valve V6 may be N.O, valve V7 may be normally closed to fluid flow (N.C.), and valve V8 may be N.C. The second valve assembly 435 may include valves V1, V2, V3, and V4, and is used for routing fluid toward the first fluid supply 431 and/or the second fluid supply 432, as further discussed below. In a fluid dispensing mode, valve V1 may be N.C., valve V2 may be N.C., valve V3 may be N.C. and valve V4 may be N.C.

In some examples, the first fluid supply 431 may include a replaceable fluid cartridge, such as an ink cartridge. The first fluid supply 431 may be connectable to the apparatus 430, and when connected, may form part of the apparatus 430. The second fluid supply 432 may be an intermediate tank that forms part of the apparatus 430. Although FIG. 4 (and FIGS. 5, 8, and 10) illustrate both the first and second fluid supply 431, 432, examples are not so limited and the apparatus 430 may include one of the fluid supplies or more than the two fluid supplies. For example, the apparatus 430 may include a single fluid supply, such as illustrated by FIGS. 2A-2B.

FIGS. 5-6 and 8-10, similar to FIGS. 2A-4, illustrate example apparatuses 530, 620, 830, 920, 1030 that may include respective fluidic ejection devices 512*a*, 512*b*, 612, 812*a*, 812*b*, 912, 1012*a*, 1012*b*, as examples of the fluidic ejection device 312 of FIG. 3 and/or the apparatus 430 of FIG. 4. More particularly, FIG. 5-10 may illustrate and/or be related to different modes of operation of the apparatus 430 of FIG. 4. While each apparatus may be different, in some examples, the apparatuses 530, 830, 1030 include similar functions and/or structures, and/or may include an implementation of apparatus 430. While similar components may not be further described in detail, this is not to be taken in a limiting sense. For example, the components of a particular implementation may vary slightly as compared with other implementations.

Figure 5:
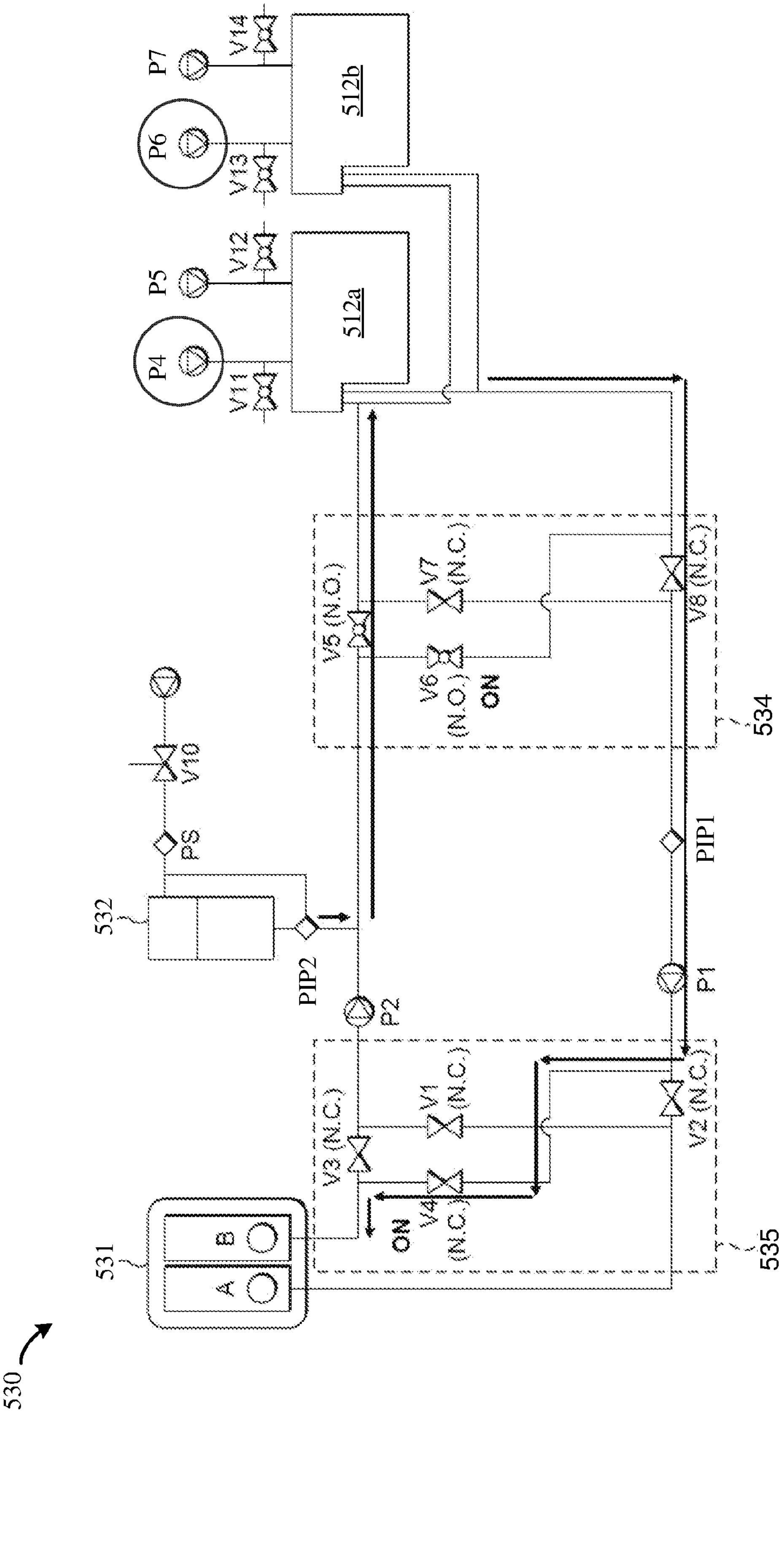
FIG. 5 illustrates an example of fluid recirculation by an apparatus, in accordance with examples of the present disclosure.

FIG. 5 illustrates an example of fluid recirculation by an apparatus, in accordance with examples of the present disclosure. The apparatus 530 may include an implementation of the apparatus 430 of FIG. 4 when being used in a first recirculation mode of operation, such as a reverse recirculation mode of operation. The apparatus 530 illustrates a flow path (as shown by the arrows) of fluid when the apparatus 530 is operating in the first recirculation mode.

Figure 6:
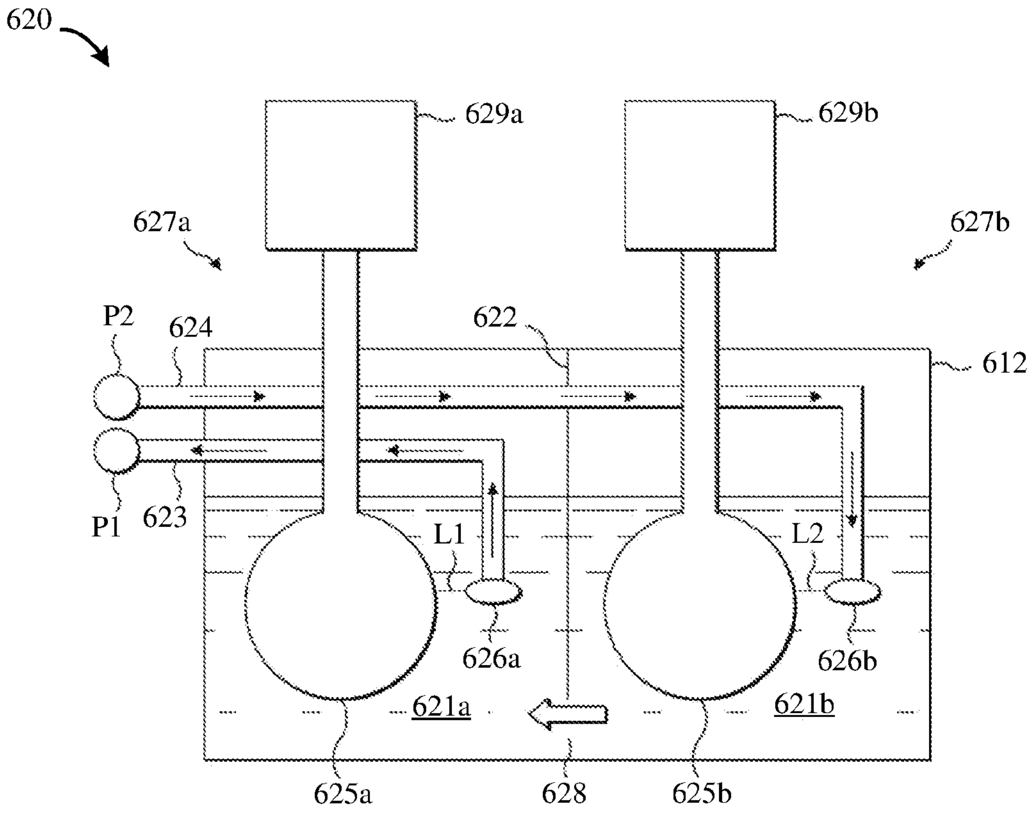
FIG. 6 illustrates an example of fluid recirculation within a fluidic ejection device of the apparatus illustrated by FIG. 5, in accordance with examples of the present disclosure.

In the first recirculation mode, the first fluidic pump P1 creates a negative pressure between the first fluid supply 531 and the fluidic ejection device(s) 512*a*, 512*b*, such as the first port 626*a* of the fluidic ejection device 612 illustrated by FIG. 6. The second fluidic pump P2 creates a positive pressure between the second fluid supply 532 and the second ports of the fluidic ejection device(s) 512*a*, 512*b*, such as the second port 326*b* of the fluidic ejection device 612 illustrated by FIG. 3. For the first recirculation mode, the valves V5 and V8 are open to fluid flow, and the valves V6 and V7 are closed to fluid flow for the valves of the first valve assembly 534. The fluid may circulate from the second fluid supply 532 to the first fluid supply 531 via the fluidic ejection devices 512*a* and 512*b*.

The first recirculation mode may include two (or more) priming operations. A first pulsed signal may be provided to the first priming pump P4 and the third priming pump P6 to cause a first priming operation, such as described above in the method 100 of FIG. 1. In the first priming operation, the controller circuit (not illustrated by FIG. 5) provides the first pulsed signal as a plurality of pulses, at a duty cycle, to the first priming pump P4 until a first sensor signal is received from the second pressure sensor PIP2 located proximal to the second fluidic pump P2 and/or near the second fluid supply 532. The first sensor signal may indicate that fluid is flowing along a fluid flow path, such as the recirculation path along the arrows from the second fluid supply 532 toward the second port(s) of the fluidic ejection device(s) 512*a*, 512*b*, and/or that the first port(s) are in an open state. For example, the first sensor signal may indicate an increase in fluid pressure as measured by the second pressure sensor PIP2. In response to the first sensor signal, the pulses of the first pulsed signal may cease and/or are no longer sent, and the first priming operation may be complete.

In response to a second sensor signal from the first pressure sensor PIP1, a second priming operation may begin. The first pressure sensor PIP1 may measure fluid pressure of fluid near the first fluidic pump P1. In response to the second sensor signal being indicative of the first port(s) of the fluidic ejection device(s) 512*a*, 512*b* transitioning from the open state to the closed state, a second signal is provided to the first priming pump P4 and the third priming pump P6. The second signal may cause the second priming operation, such as described by the method 100 of FIG. 1 above. For example, as the first ports start to transition to the closed state, the signal from the first pressure sensor PIP1 starts to decrease, such as moving away from zero or more negative. In the second priming operation, the controller circuit (not illustrated) provides a single signal or pulse to the first priming pump P4 (and third priming pump P6) to cause the first port(s) to remain in the open state during the recirculation mode.

In some examples, the valve arrangements of the second valve assembly 535 allow the fluid to flow from the second fluid supply 532, and back to the first fluid supply 531. To achieve this, the valve V4 may open, and the valves V1, V2 and V3 may be closed.

In some examples, the valve arrangements of the second valve assembly 535 may be different than that shown in the apparatus 530. For example, the fluid may flow from the second fluid supply 532 (as shown), and back to the second fluid supply 532 instead of flowing back to the first fluid supply 531. The fluid may be arranged to flow back to the second fluid supply 532 if the valves V2 and V1 are open and the valves V3 and V4 are closed.

In various examples, the apparatus 530 may include one fluid supply, such as the first fluid supply 531 and similar to fluid supply 216 of FIGS. 2A-2B. The valve arrangements of the second valve assembly 535 may allow the fluid to flow from the first fluid supply 531, and back to the first fluid supply 531. In such examples, the valves V1 and V3 may be omitted. For example, the first fluid supply 531 may comprise a first part A and a second part B (as shown in FIG. 5). When the fluid is flowing from the second part B back to the first part A, the valve V2 is open, and the valve V4 is closed.

In some examples, valves V1 and V3 may be used for refilling the second fluid supply 532 with fluid from the first fluid supply 531. For example, when the fluid is provided from the first part A of the first fluid supply 531 to the second fluid supply 532, valve V1 may be open, and when the fluid is provided from the second part B of the first fluid supply 531 to the second fluid supply 532, valve V3 may be open.

Examples are not so limited, and various examples may include many other valve configurations and many other fluid supply arrangements are possible.

FIG. 6 illustrates an example of fluid recirculation within a fluidic ejection device of the apparatus illustrated by FIG. 5, in accordance with examples of the present disclosure. The fluidic ejection device 612 may be implemented in the apparatus 530 of FIG. 5 when the apparatus 530 is being operated in a first recirculation mode. For example, the fluidic ejection device 612 may include and/or be implemented as the fluidic ejection device 512*a* of FIG. 5 and the apparatus 620 may include and/or be implemented as the apparatus 530. The fluidic ejection device 612 illustrates a flow path (as shown by arrows) of fluid within the fluidic ejection device 612 while the apparatus 620 is operated in the first recirculation mode.

In the first recirculation mode, such as a reverse recirculation mode, the first fluidic pump P1 creates a negative pressure between a fluid supply (such as the first fluid supply 531 of FIG. 5) and the first port 626*a* of the fluidic ejection device 612. Further, the second fluidic pump P2 creates a positive pressure between a fluid supply (such as the second fluid supply 532 of FIG. 5) and the second port 626*b* of the fluidic ejection device 612. A first pulsed signal may be provided to the first priming pump 629*a* (priming pump P4 of FIG. 5).

At each pulse of the first pulsed signal, the first priming pump 629*a* is activated (for example, the priming pump 629*a* provides a pumping action), such that the first priming pump 629*a* causes the first port 626*a* to remain in the open state during the recirculation cycle. The first pulsed signal may keep the first regulator bag 625*a* (of the first regulator 627*a*) inflated over a threshold inflated position to keep the first port 626*a* open over a threshold open position by using the pulsed pumping action.

In some examples, the first pulsed signal may be an alternating pulsed signal which is provided during a recirculation cycle. When a pulse of the first pulsed signal is "high", the first regulator bag 625*a* is inflated using the pumping action of the first priming pump 629*a*. When the pulse of the first pulsed signal is "low", the first priming pump 629*a* may not be activated, and there is no pumping action, and the first regulator bag 625*a* may deflate gradually. Another pumping action may be provided at the next "high" pulse, before the first regulator bag 625*a* deflates below a threshold inflated positon and before the valve opening of the first port 626*a* reaches below the threshold open position. When the first regulator bag 625*a* is inflated, at each "high" pulse, the first port 626*a* is in the open state. The fluid may then enter the fluidic ejection device 612 through the second port 626*b*, which is in an open state by action of fluid pressure applied by first fluidic pump P1, the fluid moves from the second chamber 621*b* to the first chamber 621*a* through the gap 628 in the partition 622, and the fluid exits the fluidic ejection device 612 through the first port 626*a* and along the first tube 623 (as shown by the arrows).

The first pulsed signal may be provided until a first sensor signal from the second pressure sensor (such as PIP2 illustrated by FIG. 5) is received that indicates fluid is flowing along the second fluidic path, such as fluid flowing from the second fluid supply (such as 532 of FIG. 5) toward the second port 626*b* of the fluidic ejection device 612 along the second tube 624. For example, the first sensor signal may indicate a positive pressure above a threshold. In response, the controller circuit (not illustrated by FIG. 6) may cease sending the pulses of the first pulsed signal.

To allow the recirculation to continue over a period of time, such as a time of the recirculation cycle, the first port 626*a* may remain in the open state. After the initial activation of the first priming pump 629*a*, with the pulsing, the first port 626*a* may be in the open state, but may fully or partially close or otherwise begin to transition to a closed state after a few seconds due to the first regulator bag 625*a* deflating gradually (and may reach a partially deflated position below the threshold inflated position) and causing lever L1 to fully or partially block the valve opening of the first port 626*a*. To cause the first port 626*a* to remain in the open state, the first priming pump 629*a* may be (again) activated. For example, in response to a second sensor signal from the first pressure sensor (such as PIP1 illustrated by FIG. 5) that indicates first port 626*a* is transitioning from the open state to the closed state, a second signal may be provided to the first priming pump 629*a*. The second signal may be provided anytime during the recirculation cycle and/or multiple times, in response to a sensor signal from the first pressure sensor indicating an increase in negative pressure, such as a decrease in pressure. In response to the second signal, a pumping action is provided by the first priming pump 629*a*, which keeps the first port 626*a* in the open state. Each time the pumping action is provided, the first regulator bag 625*a* inflates from a partially deflated position to an inflated position, causing the first port 626*a* to remain in the open state.

The additional priming operation during the recirculation cycle, caused by the second signal and in response to the sensor signal from the first pressure sensor, may allow for the first port 626*a* to remain in the open state during the entire recirculation cycle, and which may ensure that the recirculation does not stop before the recirculation ends. If the first regulator bag 625*a* is inflated once and/or with the first pulsed signal, the first regulator bag 625*a* may deflate which may cause the first port 626*a* to be in a closed state when fluid flow is low. In such examples, the recirculation flow may stop before the end of the recirculation cycle. Providing the first pulsed signal to the first priming pump 629*a* for the entire recirculation cycle may place stress on components of the first priming pump 629*a* and/or the fluidic ejection device 612. For example, the control mechanism of the first port 626*a*, such as the solenoid valve, may overheat which may cause damage. The additional priming operation may allow for the valves of the first port 626*a* to remain in the open state throughout the recirculation cycle, while avoiding overheating of the valves. Recirculation may be performed throughout the recirculation cycle, and may not be affected by a level of fluid. Further, a duration of the recirculation cycle may be increased if the additional priming operation is used, as compared to a single signal or activation of the first priming pump 629*a.*

During a recirculation cycle, the first pulsed signal and second signal may be provided to one of priming pumps 629*a*, 629*b*, so that one of the ports 626*a*, 626*b* is in the open state due to the pumping action during the recirculation cycle. At a next recirculation cycle, the other of the ports may be opened, such as using the second priming pump 629*b* to keep the second regulator bag 625*b* (of the second regulator 627*b*) inflated. The priming operation may not be continuously performed on a particular port. For example, the priming operations may last for a subset of the total duration of the recirculation cycle, to avoid fluid drooling at nozzles of the fluidic ejection device. Using the signals, the particular port remains in the open state throughout the entire recirculation cycle, and the fluid recirculates.

Figure 7:
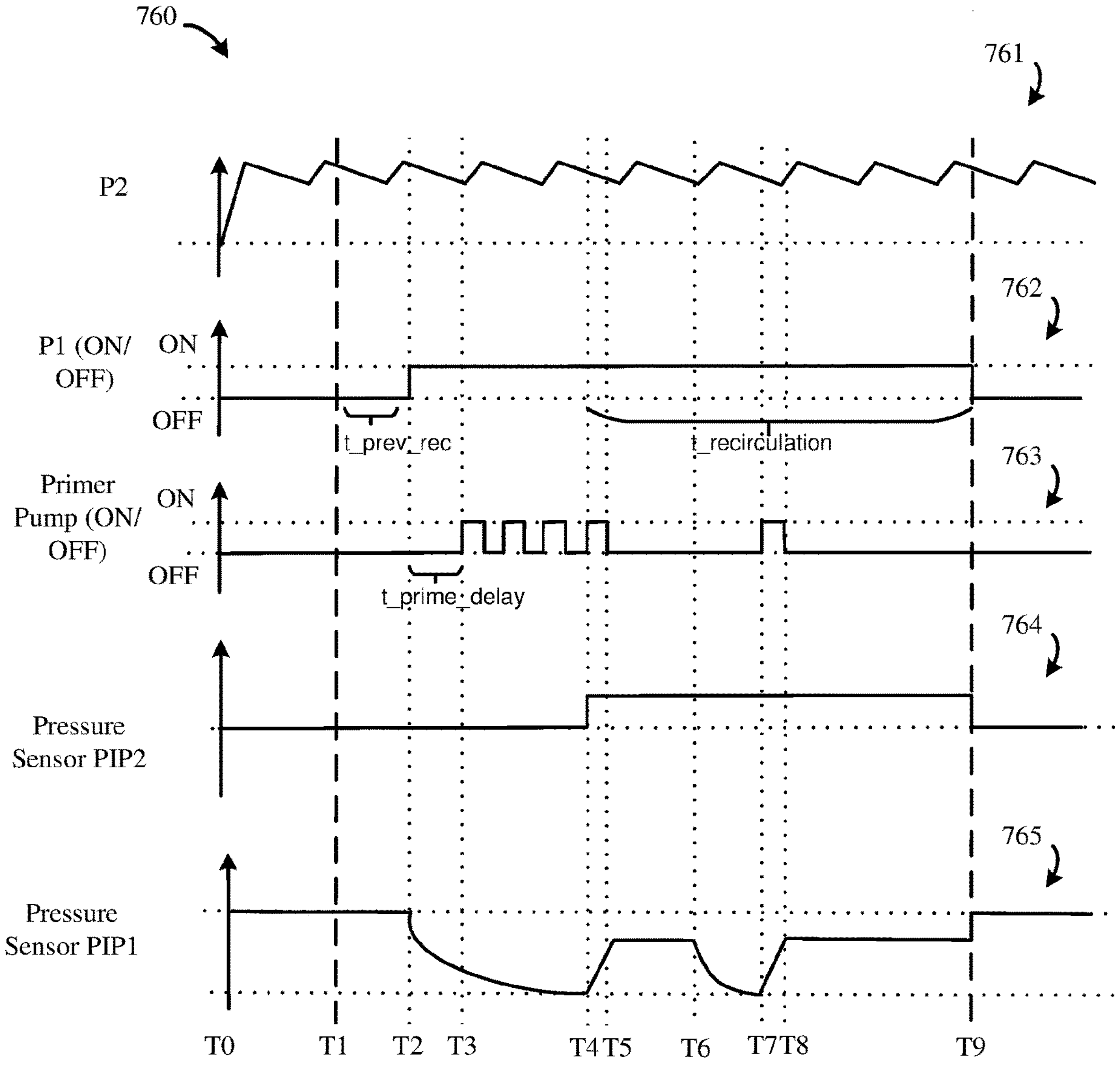
FIG. 7 illustrates an example timing diagram of an apparatus while operating in a fluid recirculation mode, in accordance with examples of the present disclosure.

FIG. 7 illustrates an example timing diagram of an apparatus while operating in a fluid recirculation mode, in accordance with examples of the present disclosure. The fluid recirculation mode may include the first recirculation mode as illustrated by FIGS. 5-6. A timing diagram for the apparatus while operating in second recirculation mode, as further illustrated herein by FIGS. 8-9, may be similar to the timing diagram 760, but with the operations being on the second priming pump (for example P5) to keep the second port in an open state. The graphs 761, 762, 763, 764, 765 respectively illustrate the timing of operations of the second fluidic pump P2, the first fluidic pump P1, the first priming pump (for example P4), the second pressure sensor PIP2, and the first pressure sensor PIP1.

The timing diagram 760 illustrates an example cycle of a fluid recirculation mode. The cycle of the fluid recirculation mode starts at TO and ends at time T9. At time T0, the second fluid pump P2 creates a positive pressure as illustrated by graph 761.

A first time period may pass (such as, the time period between TO and T1) when the recirculation cycle begins, such that there may be at least a time equal to the first time period between each recirculation cycle. For example, before time T0, there may have been a previous recirculation cycle, and the first time period allows the apparatus to return to an initial setting. The first time period may, for example, be five seconds, although examples are not so limited. During the first time period, all valves (such as V1 to V8 illustrated by FIG. 4) may be closed to ensure that the fluidic ejection device (such as 212, 312, 412*a*, 412*b* illustrated by FIGS. 2-4) and regulators (such as regulators 327*a* and 327*b* of FIG. 3) of the fluidic ejection device are ready and stable.

At time T2, (after the first time period or t_prev_rec after T1), the first fluidic pump P1 creates a negative pressure until time T8 as illustrated by graph 762. At time T1, a valve or a plurality of valves of the second valve assembly (such as, assembly 435 illustrated by FIG. 4) may be opened or closed. The changes in valve positions may cause temporary oscillations on the first and second pressure sensors PIP1, PIP2, as illustrated by FIG. 4. The first time period (or t_prev_rec) may be provided prior to the first fluidic pump P1 being activated, such that temporary oscillations end and the apparatus stabilizes before negative (suction) pressure is applied. This may prevent or mitigate the pressure sensors PIP1, PIP2 from providing false readings due to the temporary oscillations. In some examples, the period from T1 to T2 may be omitted.

A first pulsed signal may be provided to the first priming pump at time T3, which may be after a second time period t_prime_delay after time T2, as shown by graph 763. The second time period t_prime_delay may pass after the negative fluid pressure is created at time T2, such that the fluid pressure may build up in the flow path of the fluid before the first priming pump (such as P4 shown in apparatus 430) is activated. The second time period t_prime_delay may allow for time to pass for creating a negative pressure which may be above a threshold (e.g., high enough) to start flow of fluid when the first priming pump is activated. The time t_prime_delay may, for example, be 0.5 seconds, although examples are not so limited and other durations may be used.

A second pressure sensor PIP2 may measure fluid pressure of fluid near the second fluid supply and/or proximal to the second fluidic pump P2 as shown by at least by FIG. 4. The measurements (e.g., the sensor signals or determined from the sensor signals) of the second pressure sensor PIP2 are illustrated by graph 764. The recirculation flow of fluid may start at time T4. As shown by graph 764, there may be a delay between the activation of the first fluid pump (at time T2) and the start of recirculation or fluid flow (at time T4), which may be caused by a delay between activation of the first priming pump (for example, first priming pump 329*a* of FIG. 3) and the opening of the first port (for example the first port 326*a* of FIG. 3). When the recirculation starts (at time T4), the second pressure sensor PIP2 measures a first sensor signal that indicates an increase in fluid pressure. The increase in fluid pressure may indicate that fluid is flowing. When the recirculation ends at time T9, the second pressure sensor PIP2 may measure a decrease in fluid pressure.

At time T5, and in response to the first sensor signal from the second pressure sensor PIP2 at time T4, the pulses of the first pulsed signal may end (or may otherwise remain "low") as shown by graph 763. By ceasing the pulses of the first pulsed signal, the number of prime pump actions may be reduced as compared to the first pulsed signal continuing for the entire recirculation cycle, and which may reduce stress provided on components of the fluidic ejection device and/or the apparatus.

A first pressure sensor PIP1 may measure the fluid pressure of fluid near the first fluidic pump P1. The measurements (e.g., the sensor signals or determined from the sensor signals) of the first pressure sensor PIP1 are illustrated by graph 765. At time T2, the negative pressure created by the first fluidic pump P1 may cause the first pressure sensor PIP1 to measure a gradual fall (e.g., to a more negative level) in fluid pressure (as shown by a downward curve between time T2 and T4 of graph 765). At T4, as the recirculation starts, and the fluid starts to flow, the pressure measured at the first pressure sensor PIP1 starts to increase, such as by moving towards zero.

The pressure may then rise to a steady value, and remain at the steady value until or unless the first port (or second port) begins to transition from an open state to a closed state. For example, as shown at time T6, the pressure measured by the first pressure sensor PIP1 begins to decrease (e.g., an increase in negative pressure or suction), which indicates to activate the first priming pump. As shown by graph 763, a second signal is provided at the first priming pump at time T7, in response to the sensor signal from the first pressure sensor PIP1. In response to the activation of the first priming pump the pressure measured by the first pressure sensor PIP1 may increase back toward the steady value at time T8, as shown by graph 765, and in some examples, may remain at the steady value until the end of the recirculation cycle at time T9.

Although the above examples describe a single sensor signal from the first pressure sensor PIP1 and from the second pressure sensor PIP2, such as the above described first sensor signal and second sensor signal, examples are not so limited. For example, the first pressure sensor PIP1 and the second pressure sensor PIP2 may periodically and/or continuously provide sensor signals to the controller circuit.

In some examples, a recirculation period (t recirculation) running from T4 to T9, during which time the fluid recirculated in the apparatus, may for example, be seventy seconds. However, examples are not so limited and may include other durations.

Figure 8:
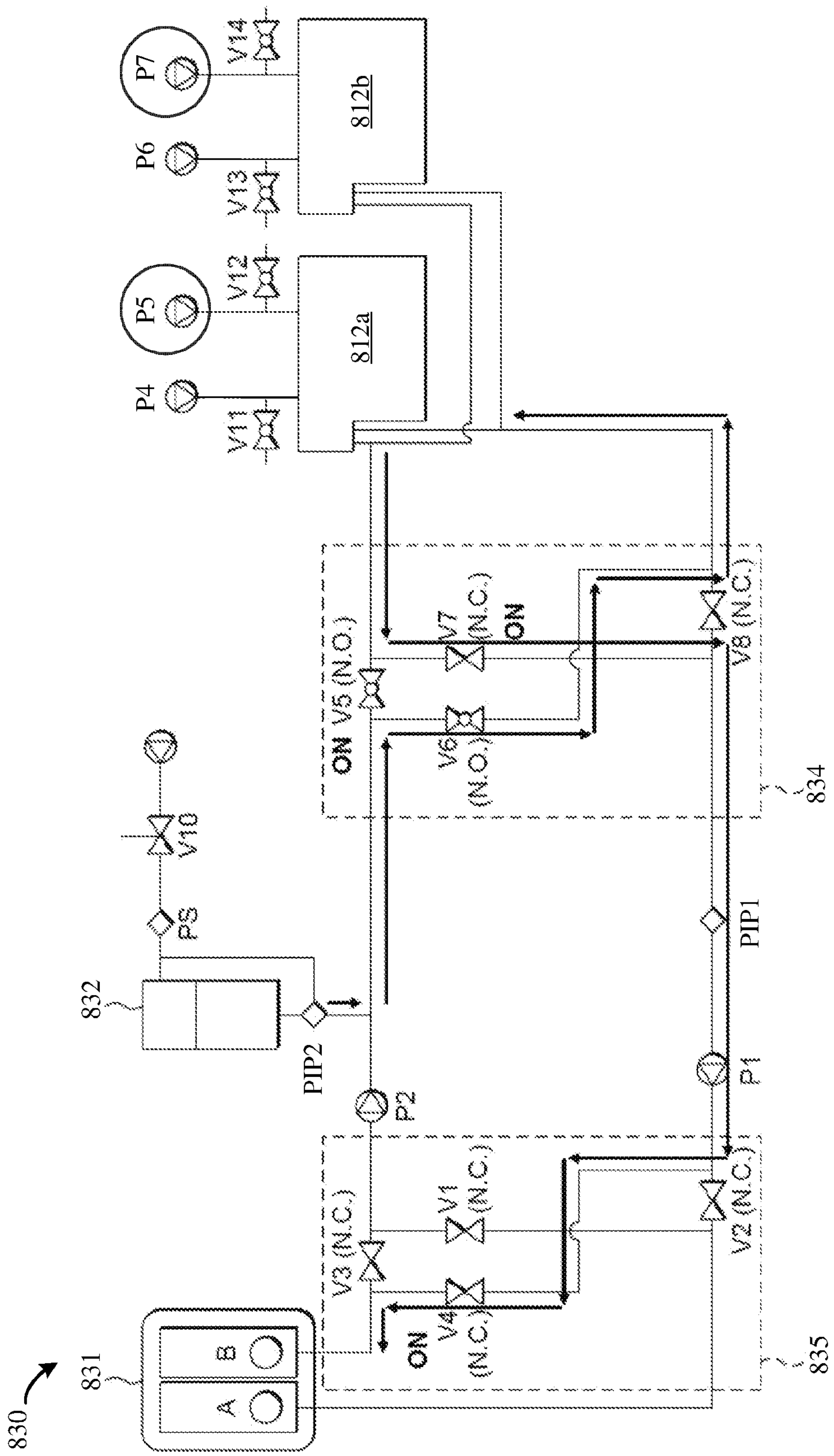
FIG. 8 illustrates another example of fluid recirculation by an apparatus, in accordance with examples of the present disclosure.

FIG. 8 illustrates another example of fluid recirculation by an apparatus, in accordance with examples of the present disclosure. The apparatus 830 may show the apparatus 430 of FIG. 4 being used in a second recirculation mode of operation, such as a forward recirculation mode of operation. The apparatus 830 illustrates a flow path (as shown by the arrows) of fluid when the apparatus 830 is operating in the second recirculation mode.

Figure 9:
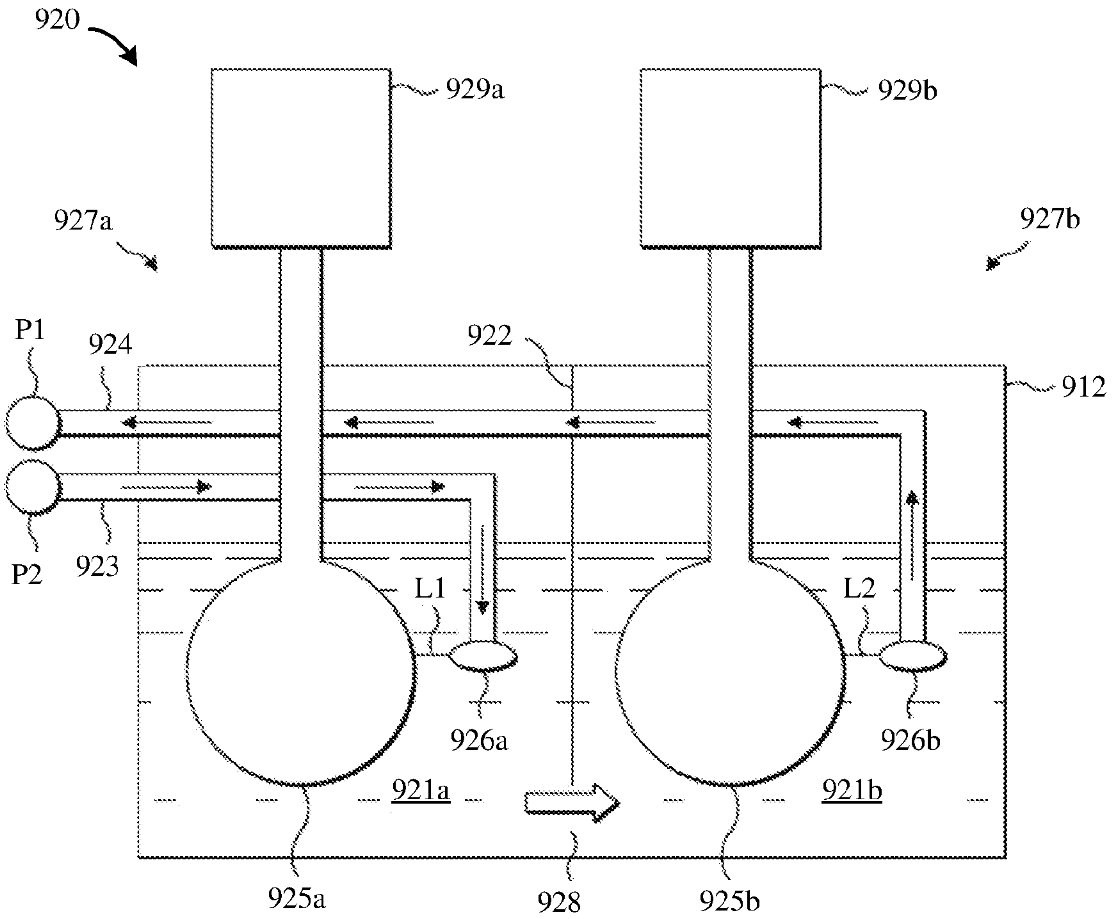
FIG. 9 illustrates an example of fluid recirculation within a fluidic ejection device of the apparatus illustrated by FIG. 8, in accordance with examples of the present disclosure.

In the second recirculation mode, the first fluidic pump P1 may create a negative pressure between the first fluid supply 831 and the second port of the fluidic ejection devices 812*a*, 812*b*, such as the second port 926*b* illustrated by FIG. 9. The second fluidic pump P2 may create a positive pressure between the second fluid supply 832 and the first ports of the fluidic ejection devices 812*a*, 812*b*, such as the first port 926*a* illustrated by FIG. 9.

For the second recirculation mode, the valves V6 and V7 of the first valve assembly 834 are open to fluid flow, and the valves V5 and V8 are closed to fluid flow. The fluid may circulate from the second fluid supply 832 to the first fluid supply 831 via the fluidic ejection devices 812*a* and 812*b*. The first valve assembly 834 and second valve assembly 835 may be arranged as previously described in connection with FIGS. 4-5.

Similarly to FIG. 5, a first pulsed signal is provided to the second priming pump P5 and the fourth priming pump P7 to cause a first priming operation, as previously described above. Upon receiving a first sensor signal from the second pressure sensor PIP2, the first pulsed signal may no longer be periodically sent and/or the first priming operation may be complete. In response to a second sensor signal from the first pressure sensor PIP1, a second priming operation may begin. For example, in response to the second sensor signal, a second signal is provided to the second priming pump P5 and the fourth priming pump P7 to cause the second priming operation, as described above.

FIG. 9 illustrates an example of fluid circulation within a fluidic ejection device of the apparatus illustrated by FIG. 8, in accordance with examples of the present disclosure. The fluidic ejection device 912 may include and/or be implemented as the fluidic ejection device 812*a* of FIG. 8 and the apparatus 920 may include and/or be implemented as the apparatus 830 when the apparatus 830 is operated in a second recirculation mode. The fluidic ejection device 912 illustrates an example of fluid circulation including a flow path (as shown by arrows) of fluid within the fluidic ejection device 912 while the apparatus 920 is operated in the second recirculation mode.

In the second recirculation mode, such as a forward recirculation mode, the first fluidic pump P1 creates a negative pressure between a fluid supply (such as the first fluid supply 831 of FIG. 8) and the second port 926*b* of the fluidic ejection device 912. Further, the second fluidic pump P2 creates a positive pressure between a fluid supply (such as the second fluid supply 832 of FIG. 8) and the first port 926*a* of the fluidic ejection device 912. A first pulsed signal may be provided to the second priming pump 929*b*, which may be priming pump P5 and/or P7 of FIG. 8.

The first pulsed signal may be provided until the first sensor signal from the second pressure sensor (such as PIP2 of FIG. 8) is received that indicates fluid is flowing along the second fluidic path, which may indicate fluid is flowing along the first tube 923. Subsequently, a second signal may be provided to the second priming pump 929*b* in response to a second sensor signal from the first pressure sensor (such as PIP1 of FIG. 8). The second signal may cause the second port 926*b* to remain in the open state by activating the second priming pump 929*b*. In response to the second signal, a pumping action is provided by the second priming pump 929*b*, which keeps the second port 926*b*, which may be transitioning to a closed state, in the open state.

At each pulse of the first pulsed signal and the second signal, the second priming pump 929*b* is activated (for example, the priming pump 929*b* provides a pumping action), such that the second priming pump 929*b* causes the second port 926*b* to remain in the open state. The first pulsed signal and second signal may keep the second regulator bag 925*b* inflated over a threshold inflated position to keep the second port 926*b* in the open state by using the pulsed pumping action. The operations of the second priming pump 929*b*, the second port 926*b*, the second regulator bag 925*b* of the second regulator 927*b*, and the lever L2 is similar to the operations of the first priming pump 629*a*, the first port 626*a*, the first regulator bag 625*a*, and the lever L1 as previously discussed in FIG. 6 (and which may respectively be implemented as first priming pump 929*a*, the first port 926*a*, the first regulator bag 925*a* of the first regulator 927*a*, and the lever L1 of FIG. 9)

As with FIG. 6, with each pulse of the first pulsed signal or the second signal, when a pulse of the first pulsed signal or the second signal is "high", the second regulator bag 925*b* may be inflated using the pumping action of the second priming pump 929*b*. When the pulse of the first pulsed signal or the second signal is "low", the second priming pump 929*b* may not be activated, and there may not be a pumping action, and the second regulator bag 925*b* may deflate. Another pumping action may be provided at the next "high" pulse, before the regulator bag 925*b* deflates below a threshold inflated positon and before the valve opening of the second port 926*b* reaches below the threshold open position. When the second regulator bag 925*b* is inflated, at each "high" pulse, the second port 926*b* is in the open state. The fluid may then enter the fluidic ejection device 912 through the first tube 923 and the first port 926*a*, which is in an open state by action of fluid pressure applied by first fluidic pump P1, moves from the first chamber 921*a* to the second chamber 921*b* through the gap 928 in the partition 922, and exits the fluidic ejection device 912 through the second port 926*b* and the second tube 924 (as shown by the arrows).

During a recirculation cycle, when the second priming pump 929*b* (which may include P5 or P7 of FIG. 8) is activated, the first priming pump 929*a* (which may include P4 or P6 of FIG. 8) may not be activated, such that one of the two priming pumps 929*a*, 929*b* of the fluidic ejection device 912 is activated at a given time. The priming operations provided by the first pulsed signal and second signal at the second priming pump 929*b* is similar to the priming operation discussed in relation to the first priming pump 629*a* in FIG. 6.

Figure 10:
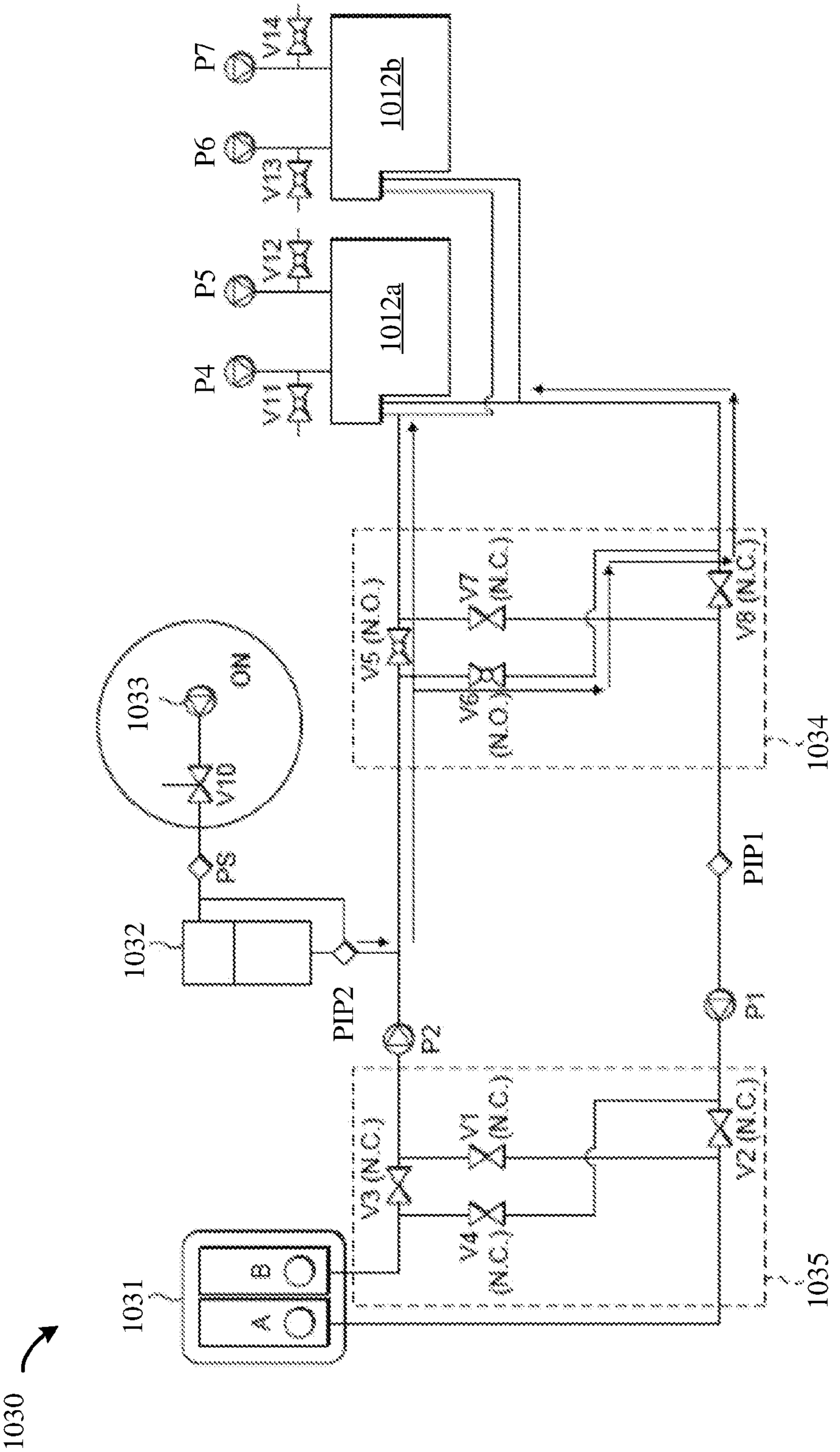
FIG. 10 illustrates an example of fluid circulation by an apparatus, in accordance with examples of the present disclosure.

FIG. 10 illustrates an example of fluid circulation by an apparatus, in accordance with examples of the present disclosure. For example, the apparatus 1030 illustrated by FIG. 10 may be the apparatus 430 of FIG. 4 while being operating in a fluid dispense mode. The apparatus 1030 is illustrated with flow paths (as shown by arrows) of the fluid when the apparatus 1030 is operating in the fluid dispense mode.

When the apparatus 1030 is in the fluid dispense mode, the fluid may not be recirculated, and therefore, the first and second fluidic pumps P1 and P2, and the various priming pumps P4, P5, P5, and P7 may be inactive, and the fluid dispensing pump 1033 is active. Fluid may be supplied from the second fluid supply 1032 and may flow through both the first ports and the second ports of the fluidic ejection devices 1012*a*, 1012*b*. The flow of the fluid may be facilitated by opening the valves V5 and V6, and closing the valves V7 and V8 of the first valve assembly 1034 (and the valves of the second valve assembly 1035 may be operated normally). This may allow for the fluid to flow towards the fluidic ejection devices 1012*a*, 1012*b*, and not back to the first and second fluid supplies 1031, 1032. For example, and when referring back to FIG. 3, as the fluidic ejection device 312 receives the fluid through the first port 326*a*, the fluid enters the first chamber 321*a* through the first tube 323. As the fluidic ejection device 312 receives the fluid through the second port 326*b*, the fluid enters the second chamber 321*b* through the second tube 324. In the fluid dispensing mode, the first and second priming pumps 329*a* and 329*b*, which may include pumps P4, P5 of FIG. 10, may be deactivated, and the plurality of nozzles in a surface of the fluidic ejection devices 1012*a*, 1012*b* may be used for dispensing the fluid to a substrate.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited by the claims and the equivalents thereof.

The invention claimed is:

1. A method, comprising:
- generating a negative fluid pressure between a fluid supply and a first port of a fluidic ejection device;
- generating a positive fluid pressure between the fluid supply and a second port of the fluidic ejection device; and
- selectively activating a first priming pump connected to the first port in response to an indication that the first port is transitioning from an open state to a closed state, wherein the selective activation of the first priming pump causes the first port to remain in the open state and causes fluid within the fluidic ejection device to exit through the first port and recirculate along a fluid flow path.

2. The method of claim 1, wherein selectively activating the first priming pump includes controlling recirculation flow of the fluid between the fluid supply and the fluidic ejection device using closed-loop priming.

3. The method of claim 1, wherein selectively activating the first priming pump includes:
- providing a first pulsed signal to the first priming pump and until a first sensor signal is received, wherein the first sensor signal indicates the first port is in the open state and the first port is to transition from the closed state to the open state in response to the first pulsed signal; and
- providing a second signal to the first priming pump in response to the indication, the indication including a second sensor signal that indicates the first port is transitioning to the closed state, and wherein the first port remains in the open state in response to the second signal.

4. The method of claim 3, further including capturing the first sensor signal via a second pressure sensor located proximal to a second fluidic pump that creates the positive fluid pressure, the first sensor signal indicating the fluid is flowing through the fluid flow path.

5. The method of claim 3, further including capturing the second sensor signal via a first pressure sensor located proximal to a first fluidic pump that creates the negative fluid pressure, the second sensor signal indicating a change in pressure at the first pressure sensor.

6. The method of claim 1, wherein the method further includes, in response to the selective activation of the first priming pump, activating a regulator to transition the first port to the open state and to maintain the first port in the open state.

7. The method of claim 1, further including removing the negative fluid pressure and positive fluid pressure, and:
- generating a second negative fluid pressure between the fluid supply and the second port;
- generating a second positive fluid pressure between the fluid supply and the first port; and
- selectively activating a second priming pump connected to the second port in response to an indication that the second port is transitioning from the open state to the closed state, wherein the selective activation of the second priming pump causes the second port to remain in the open state and causes fluid within the fluidic ejection device to exit through the second port.

8. An apparatus, comprising:
- a first fluidic pump to selectively create a negative fluid pressure between a fluid supply and a first port of a fluidic ejection device;

a second fluidic pump to selectively create a positive fluid pressure between the fluid supply and a second port of the fluidic ejection device;

a first priming pump connectable to the first port;

a first pressure sensor located within a fluid flow path; and a controller circuit connected to the first priming pump, the controller circuit to provide a signal to the first priming pump to selectively activate the first priming pump in response to a sensor signal from the first pressure sensor, the sensor signal indicating that the first port is transitioning from an open state to a closed state, wherein the selective activation of the first priming pump causes the first port to remain in the open state and causes fluid within the fluidic ejection device to exit through the first port and recirculate along the fluid flow path.

9. The apparatus of claim 8, wherein the fluid flow path includes:

a first flow path connectable to the first port; and a second flow path connectable to the second port, and wherein:

the first pressure sensor is located within the first flow path and proximal to the first fluidic pump, and the apparatus further includes a second pressure sensor located within the second flow path and proximal to the second fluidic pump.

10. The apparatus of claim 9, wherein the controller circuit is to:

provide a first pulsed signal to the first priming pump after the first fluidic pump is activated and until a first sensor signal is received from a second pressure sensor, the first sensor signal indicating that the first port is in the open state; and provide the signal to the first priming pump in response to the sensor signal from the first pressure sensor, wherein the first port is to remain in the open state in response to the sensor signal.

11. The apparatus of claim 8, further including the fluidic ejection device including the first port and the second port, wherein the fluidic ejection device further includes:

a first regulator to place the first port in the open state and in the closed state; and a second regulator to place the second port in the open state and in the closed state.

12. The apparatus of claim 11, wherein the first regulator includes a first regulator bag that inflates in response to the activation of the first priming pump and the second regulator includes a second regulator bag, and the apparatus further includes a second priming pump connected to the second port that activates to inflate the second regulator bag.

13. An apparatus, comprising:

a fluidic ejection device including a first port connected to a first flow path, a second port connected to a second flow path, and a first regulator connected to the first port to selectively place the first port in an open state and a closed state;

a first fluidic pump to selectively create a negative fluid pressure between a fluid supply and the first port;

a second fluidic pump to selectively create a positive fluid pressure between the fluid supply and the second port;

a first pressure sensor located within the first flow path and a second pressure sensor located within the second flow path;

a first priming pump connected to the first port; and a controller circuit connected to the first priming pump, the controller circuit to:

provide a first pulsed signal to the first priming pump and until a first sensor signal from the second pressure sensor is received, wherein the first pulsed signal causes the first port to transition to the open state and the first sensor signal indicates that the first port is in the open state; and provide a second signal to the first priming pump in response to a second sensor signal from the first pressure sensor, the second sensor signal indicating that the first port is transitioning from the open state to the closed state, wherein the second signal causes the first port to remain in the open state, and the first port being in the open state causes fluid within the fluidic ejection device to exit through the first port and recirculate along the first flow path.

14. The apparatus of claim 13, wherein the controller circuit is to:

selectively activate the first priming pump, the first fluidic pump, and the second fluidic pump while the apparatus is in a fluid recirculation mode; and provide the first pulsed signal to the first priming pump after the first fluidic pump is activated, wherein the first port is to remain in the open state in response to the first pulsed signal and the second signal and while the apparatus is in the fluid recirculation mode.

15. The apparatus of claim 13, wherein the fluid supply includes an intermediate tank and a fluid cartridge, the apparatus further including the intermediate tank, and the apparatus further including a second regulator to selectively place the second port in the open state and the closed state.

* * * * *